US012637904B2

(12) United States Patent
Qiu et al.

(10) Patent No.: US 12,637,904 B2
(45) Date of Patent: May 26, 2026

(54) CORDLESS ROLLER SHUTTER SPRING REGULATOR

(71) Applicant: Guangzhou Jue Decoration Window Decoration Technology Co., Ltd, Guangzhou (CN)

(72) Inventors: Yongzhong Qiu, Guangzhou (CN); Liwen Xu, Guangzhou (CN)

(73) Assignee: Guangzhou Jue Decoration Window Decoration Technology Co., Ltd, Guangzhou (CN)

( * ) Notice: Subject to any disclaimer, the term of this patent is extended or adjusted under 35 U.S.C. 154(b) by 329 days.

(21) Appl. No.: 18/473,191

(22) Filed: Sep. 22, 2023

(65) Prior Publication Data

US 2024/0229553 A1 Jul. 11, 2024

Related U.S. Application Data

(63) Continuation of application No. PCT/CN2023/093521, filed on May 11, 2023.

(30) Foreign Application Priority Data

Jan. 6, 2023 (CN) ........................ 202320038019.X

(51) Int. Cl.
*E06B 9/42* (2006.01)
*E06B 9/60* (2006.01)

(52) U.S. Cl.
CPC . *E06B 9/42* (2013.01); *E06B 9/60* (2013.01)

(58) Field of Classification Search
CPC ................. E06B 9/42; E06B 9/56; E06B 9/60
See application file for complete search history.

(56) References Cited

U.S. PATENT DOCUMENTS

2015/0136337 A1* 5/2015 Fraczek .................... E06B 9/78 192/223.4
2018/0298683 A1* 10/2018 Huang ...................... E06B 9/34
2019/0010756 A1* 1/2019 Lin .......................... E06B 9/50
(Continued)

FOREIGN PATENT DOCUMENTS

CN 207470672 U 6/2018
CN 212947606 U 4/2021
(Continued)

*Primary Examiner* — Beth A Stephan
(74) *Attorney, Agent, or Firm* — Vedder Price P.C.

(57) ABSTRACT

The present disclosure discloses a cordless roller shutter spring regulator, including a roller shutter spring pre-tightening force adjustment mechanism and a self-locking mechanism, wherein the self-locking mechanism is used to lock an adjustment shaft on the roller shutter spring pre-tightening force adjustment mechanism before an installation weight is installed; after the installation weight is installed, the self-locking mechanism unlocks the adjustment shaft on the roller shutter spring pre-tightening force adjustment mechanism under a top pressure of the installation weight. The self-locking mechanism includes a pressing spring, a self-locking ring and a fixed ring, wherein an end face of the self-locking ring is provided with a top pressure transmission rod and a ring of ratchet teeth A, the ratchet teeth A are engaged with the ratchet teeth B, the ratchet teeth A are able to slide in one direction relative to the ratchet teeth B.

7 Claims, 7 Drawing Sheets

(56) References Cited

U.S. PATENT DOCUMENTS

| | | | | |
|---|---|---|---|---|
| 2021/0238922 | A1* | 8/2021 | Schorling | E06B 9/90 |
| 2023/0313608 | A1* | 10/2023 | Lin | E06B 9/90<br>160/313 |
| 2023/0349232 | A1* | 11/2023 | Turnbull | A47H 5/02 |
| 2024/0141725 | A1* | 5/2024 | Chou | E06B 9/42 |

FOREIGN PATENT DOCUMENTS

| | | | | |
|---|---|---|---|---|
| CN | 213776548 | U | 7/2021 | |
| WO | WO-2021203159 | A1 * | 10/2021 | E06B 9/78 |

* cited by examiner

CORDLESS ROLLER SHUTTER SPRING REGULATOR

CROSS-REFERENCE TO RELATED APPLICATIONS

The application claims priority to Chinese patent application No. 202320038019.X, filed on Jan. 6, 2023, the entire contents of which are incorporated herein by reference.

TECHNICAL FIELD

The present disclosure relates to the field of cordless roller shutters, and more particularly to a cordless roller shutter spring regulator.

BACKGROUND

Cordless roller shutters are becoming increasingly popular, especially in North America and are determined by law, due to child safety issues with roller shutters. With regard to the cordless roller shutter, the spring is mainly used as a drive as a power device to drive a drum at a periphery of a spring assembly to rotate, and the drum achieves winding of the roller shutter. However, in order to achieve elastic force drive of the spring, the spring must be pre-rolled to enable the roller shutter fabric to be normally reset. After the spring is pre-tightened, if there is no fixing device, the spring will automatically release a number of pre-tightened turns, and lose the elastic force. How to pre-tighten the spring to a appropriate number of turns in the factory and perform self-locking such that the customer can automatically unlock after installation is the key issue of all spring roller shutters.

SUMMARY

It is an object of the present disclosure to provide a cordless roller shutter spring regulator that solves one or more of the problems of the prior art and at least provides an advantageous option or condition.

The technical solution adopted by the present disclosure to solve the technical problem thereof is described in the following content:

a cordless roller shutter spring regulator, including a roller shutter spring pre-tightening force adjustment mechanism and a self-locking mechanism, wherein the self-locking mechanism is used to lock an adjustment shaft on the roller shutter spring pre-tightening force adjustment mechanism before an installation weight is installed; after the installation weight is installed, the self-locking mechanism unlocks the adjustment shaft on the roller shutter spring pre-tightening force adjustment mechanism under a top pressure of the installation weight.

Further, the roller shutter spring pre-tightening force adjustment mechanism includes an adjustment shaft and a pipe sleeve, one end of the adjustment shaft extends into the pipe sleeve, the other end of the adjustment shaft is provided with an adjustment wheel, and a through hole is provided on a wheel surface of the adjustment wheel.

Further, the self-locking mechanism includes a pressing spring, a self-locking ring and a fixing ring, an end face of the self-locking ring being provided with a top pressure transmission rod and a ring of ratchet teeth A, the top pressure transmission rod being surrounded by the ring of ratchet teeth A, an end face of the fixing ring being provided with a ring of ratchet teeth B, the fixing ring being fixed on an end of the pipe sleeve via a screw, the adjustment shaft passing through the fixing ring, the pressing spring and the self-locking ring being sheathed on the adjustment shaft, the pressing spring pressing the self-locking ring against an end face of the fixing ring, so that the ratchet teeth A engage with the ratchet teeth B, the ratchet teeth A are able to slide relatively to the ratchet teeth B in one direction, one end of the top pressure transmission rod protrudes out of the pipe sleeve via the through hole on the adjustment wheel, and after the installation weight is installed, a plate surface of the installation weight pushes the top pressure transmission rod forward, and the top pressure transmission rod pushes the self-locking ring forward, so that the ratchet teeth A are disengaged from the ratchet teeth B and are unlocked.

Further, a bearing is provided between the adjustment shaft and the pipe sleeve.

Further, a spacer is also sheathed on the adjustment shaft, one end of the pressing spring presses against the self-locking ring, the other end of the pressing spring presses against the spacer, and the spacer presses against an end face of the bearing.

Further, a limiting boss is further provided on an end face of the fixing ring, a limiting groove is provided on an end face of the pipe sleeve, and when the fixing ring is mounted to the pipe sleeve, the limiting boss is located in the limiting groove.

Further, the roller shutter spring pre-tightening force adjustment mechanism further includes a roller shutter spring connector and a main shaft, the roller shutter spring connector being used for fixing one end of the roller shutter spring, the adjustment shaft being of a hollow tubular structure, one end of the adjustment shaft being provided with a shifting block, one end of the main shaft extending into a cavity of the roller shutter spring connector and being fixedly connected to the roller shutter spring connector via a screw, the other end of the main shaft extending into the adjustment shaft, a brake spring being sheathed on a surface of the main shaft, the adjustment wheel being rotated, the adjustment wheel driving the adjustment shaft, the adjustment shaft driving the shifting block, and the shifting block driving one end of the brake spring to rotate around the main shaft, so that the brake spring locks the main shaft.

Further, the other end of the brake spring presses against a side wall of a boss in the cavity of the roller shutter spring connector.

Further, a cross groove is provided on an end face of the main shaft, and an installation head of the installation weight is inserted into the cross groove.

Advantageous effects of the present disclosure are as follows:

The present disclosure improves the self-locking mechanism. When the present disclosure is installed on the installation weight, the self-locking mechanism can unlock the adjustment shaft on the roller shutter spring pre-tightening force adjustment mechanism without manual operation under the action of the installation weight, which is convenient for unlocking. The present disclosure also has the features of simple structure, strong practicability and convenience for the roller shutter spring pre-tightening force adjustment mechanism.

The present disclosure also adds a bearing between the adjustment shaft and the pipe sleeve to reduce the frictional resistance of the system.

BRIEF DESCRIPTION OF DRAWINGS

The present disclosure is further illustrated by means of the accompanying drawings, but the embodiments in the drawings do not constitute any limitation of the present disclosure, and a person skilled in the art would have been able to obtain other drawings according to the following drawings without involving any inventive effort.

Figure 1:
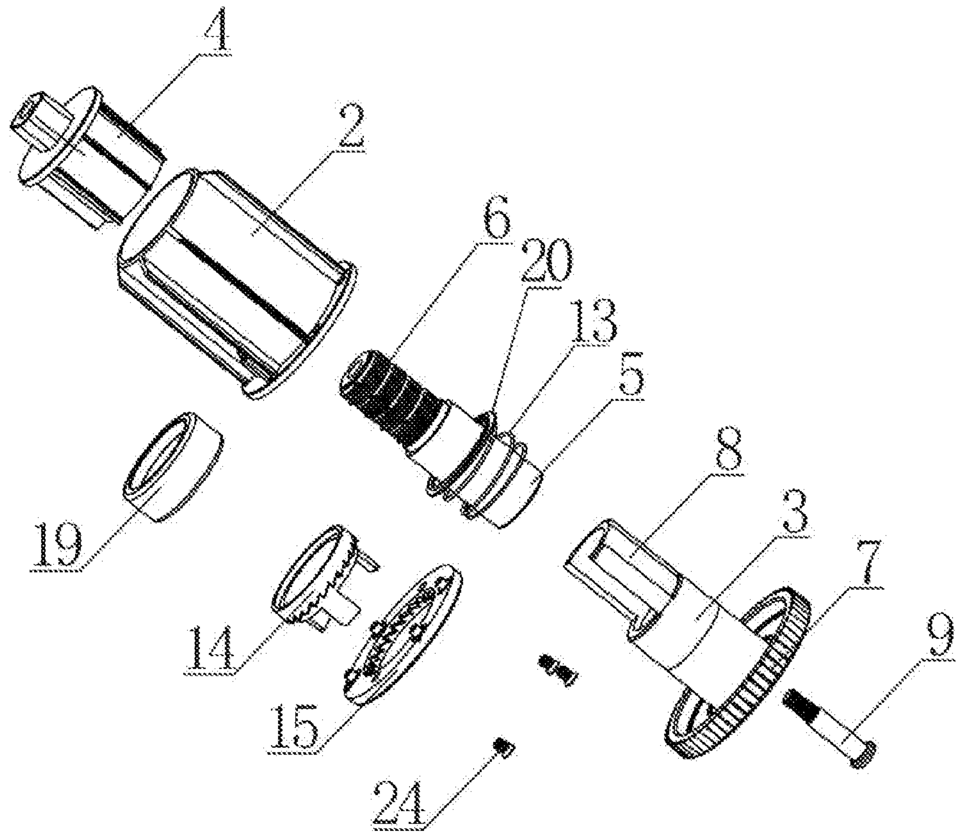
FIG. 1 is an exploded view of the present disclosure.

In the drawings: 1, installation weight; 2, pipe sleeve; 3, adjustment shaft; 4, roller shutter spring connector; 5, main shaft; 6, brake spring; 7, adjustment wheel; 8, shifting block; 9, screw; 10, through hole; 11, cross groove; 12, installation head; 13, pressing spring; 14, self-locking ring; 15, fixing ring; 16, top pressure transmission rod; 17, ratchet A; 18, ratchet B; 19, bearing; 20, spacer; 21, boss; 22, limiting boss; 23, limiting groove; 24, screws; and 25, inner wall of cavity.

DETAILED DESCRIPTION OF THE EMBODIMENTS

In order that a person skilled in the art may better understand the technical aspects of the present disclosure, the following detailed description of the disclosure is made with reference to the accompanying drawings and specific examples. It should be noted that the embodiments and technical features in the embodiments in the present disclosure can be combined with each other without conflict.

In the description of the present disclosure, it should be noted that the orientation or positional relationship indicated by the terms "center", "longitudinal", "transversal", "length", "width", "thickness", "upper surface", "lower surface", "front", "rear", "left", "right", "vertical", "horizontal", "top", "bottom", "inner", "outer", "forward", "reverse", "axial", "radial", "circumferential", etc. is based on the orientation or positional relationship shown in the drawings, merely to facilitate the description of the present disclosure and simplify the description, and does not indicate or imply that the devices or units referred to must have a particular orientation, be constructed and operated in a particular orientation, and thus should not be construed as limiting the present disclosure.

The present disclosure provides a cordless roller shutter spring regulator, including a roller shutter spring pre-tightening force adjustment mechanism and a self-locking mechanism, wherein the self-locking mechanism is used to lock an adjustment shaft on the roller shutter spring pre-tightening force adjustment mechanism before an installation weight 1 is installed; after the installation weight 1 is installed, the self-locking mechanism unlocks the adjustment shaft on the roller shutter spring pre-tightening force adjustment mechanism under a top pressure of the installation weight.

Figure 2:
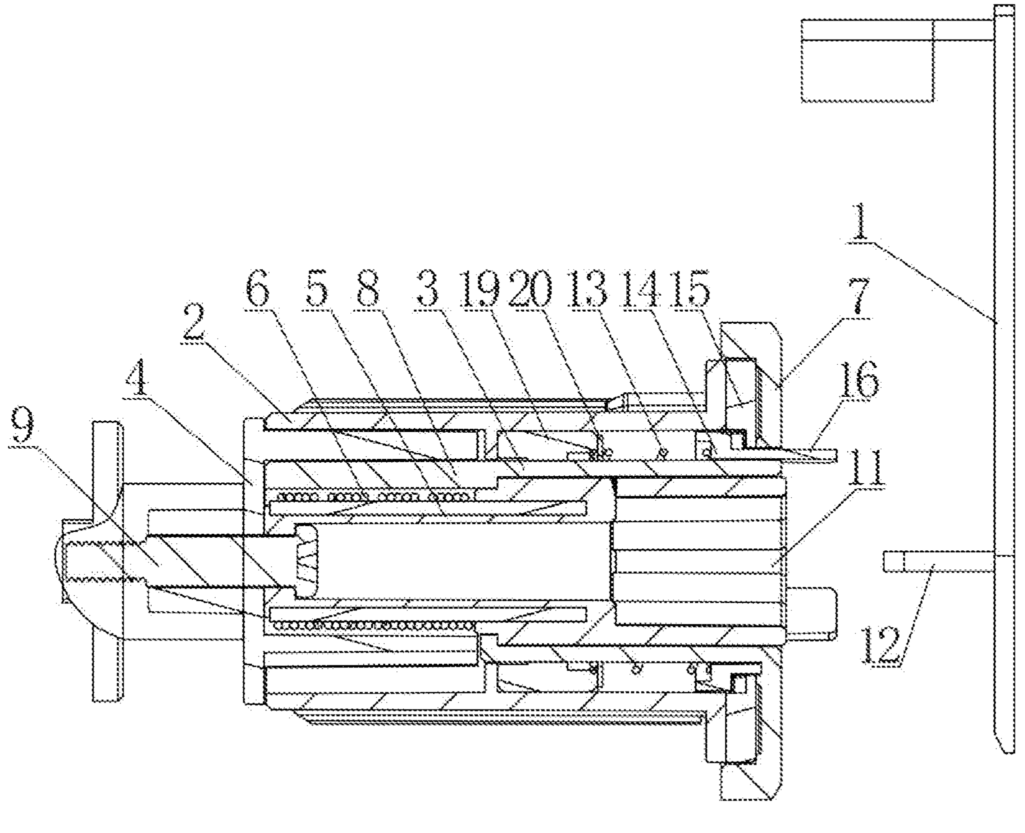
FIG. 2 is an assembled longitudinal sectional view of FIG. 1.
Figure 3:
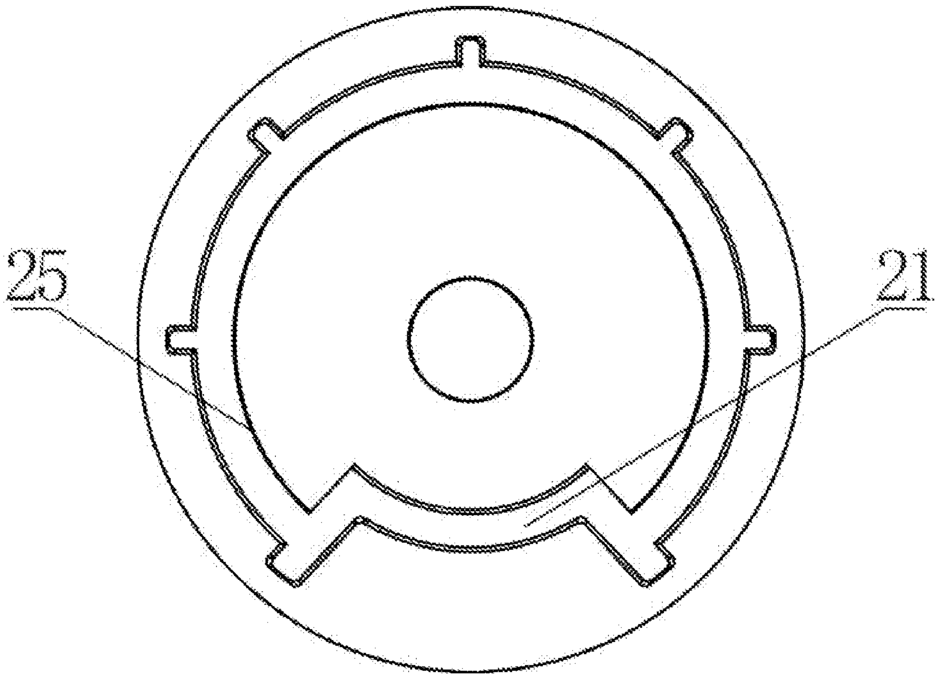
FIG. 3 is a schematic structural view showing an end face of the roller shutter spring connector shown in FIG. 2.

Specifically, as shown in FIGS. 1, 2 and 3, the roller shutter spring pre-tightening force adjustment mechanism includes a pipe sleeve 2, an adjustment shaft 3, a roller shutter spring connector 4, a main shaft 5, a brake spring 6 and an adjustment wheel 7, wherein one end of the adjustment shaft 3 extends into the pipe sleeve 2, the adjustment wheel 7 is mounted on the other end of the adjustment shaft 3 and is located outside the pipe sleeve 2, the roller shutter spring connector 4 is used for fixing one end of the roller shutter spring, the adjustment shaft 3 is of a hollow tubular structure, one end of the adjustment shaft 3 is provided with a shifting block 8, one end of the main shaft 5 extends into a cavity of the roller shutter spring connector 4 and is fixedly connected to the roller shutter spring connector 4 via a screw 9, the other end of the main shaft 5 extends into the adjustment shaft 3, a brake spring 6 is sheathed on a surface of the main shaft 5, the adjustment wheel 7 is rotated, the adjustment wheel 7 drives the adjustment shaft 3, the adjustment shaft 3 drives the shifting block 8, and the shifting block 8 drives one end of the brake spring 6 to rotate around the main shaft 5, so that the brake spring 6 locks the main shaft 5. The other end of the brake spring 6 presses against a side wall of a boss 21 on an inner wall 25 of the cavity of the roller shutter spring connector 4.

Figure 4:
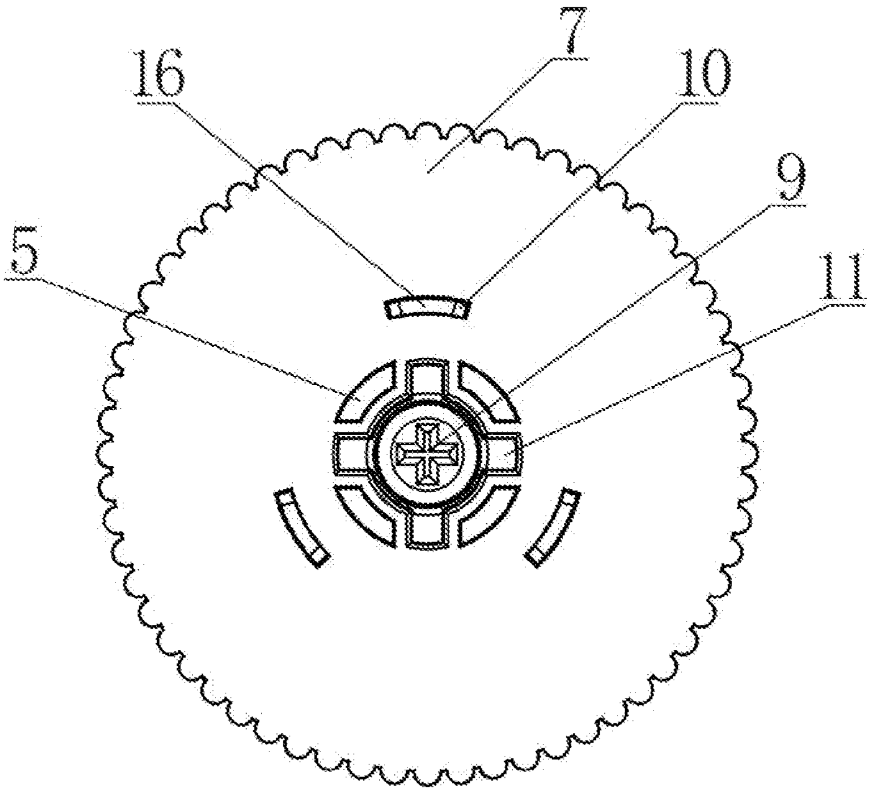
FIG. 4 is a side view of the cordless roller shutter spring regulator of FIG. 2.
Figure 5:
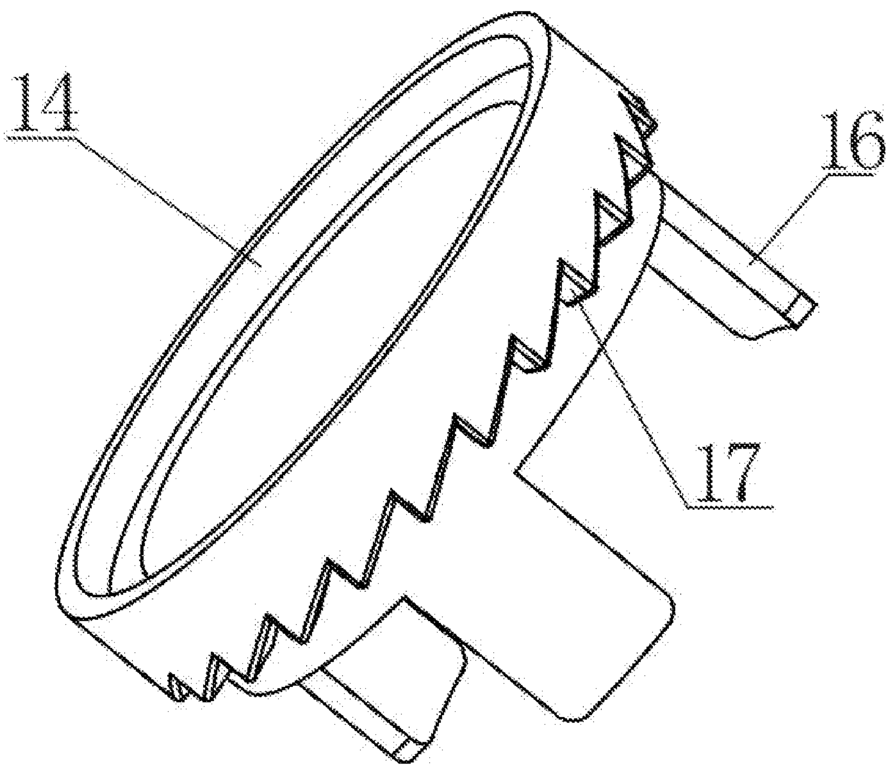
FIG. 5 is a schematic structural view of a self-locking ring shown in FIG. 2.

As shown in FIG. 4, a wheel face of the adjustment wheel 4 is provided with a through hole 10, a cross groove 11 is provided on an end face of the main shaft 5, and an installation head 12 of the installation weight 1 is inserted into the cross groove 11.

As shown in FIGS. 1, 2, 5 and 6, the self-locking mechanism includes a pressing spring 13, a self-locking ring 14 and a fixing ring 15, an end face of the self-locking ring 14 is provided with a top pressure transmission rod 16 and a ring of ratchet teeth A 17, the top pressure transmission rod 16 is surrounded by the ring of ratchet teeth A 17, an end face of the fixing ring 15 is provided with a ring of ratchet teeth B 18, the fixing ring 15 is fixed on an end of the pipe sleeve 2 via a screw 24, the adjustment shaft 3 passes through the fixing ring 15, the pressing spring 13 and the self-locking ring 14 is sheathed on the adjustment shaft 3, and the pressing spring 13 presses the self-locking ring 14 against an end face of the fixing ring 15, so that the ratchet teeth A 17 engage with the ratchet teeth B 18, the ratchet teeth A 17 are able to slide relatively to the ratchet teeth B 18 in one direction, one end of the top pressure transmission rod 16 protrudes out of the pipe sleeve 2 via the through hole 10 on the adjustment wheel 4, and after the installation weight 1 is installed, a plate surface of the installation weight 1 pushes the top pressure transmission rod 16 forward, and the top pressure transmission rod 16 pushes the self-locking ring 14 forward, so that the ratchet teeth A 17 are disengaged from the ratchet teeth B 18 and are unlocked.

A bearing 19 is provided between the adjustment shaft 3 and the pipe sleeve 2, a spacer 20 is also sheathed on the adjustment shaft 3, one end of the pressing spring 13 presses against the self-locking ring 14, the other end of the pressing spring 13 presses against the spacer 20, and the spacer 20 presses against an end face of the bearing 19.

Figure 6:
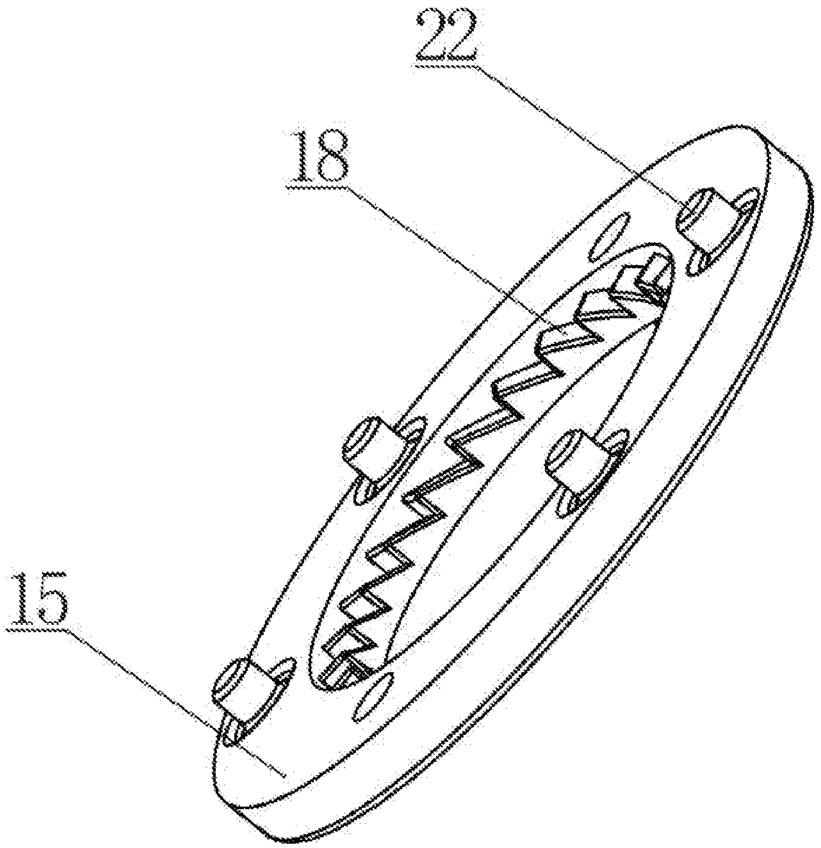
FIG. 6 is a schematic structural view of a fixing ring shown in FIG. 1.
Figure 7:
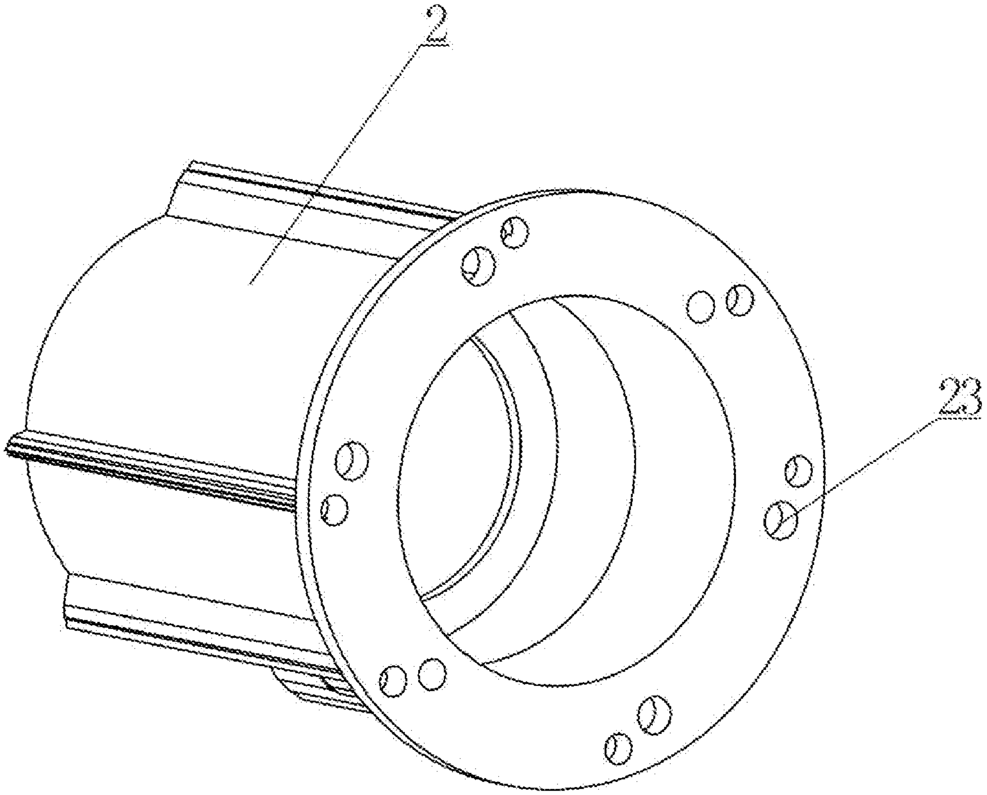
FIG. 7 is a schematic structural view of a pipe sleeve shown in FIG. 1.

As shown in FIGS. 6 and 7, a limiting boss 22 is further provided on an end face of the fixing ring 15, a limiting groove 23 is provided on an end face of the pipe sleeve 2, and when the fixing ring 15 is mounted to the pipe sleeve 2, the limiting boss 22 is located in the limiting groove 23.

Working principle: however, in order to drive the spring force of the roller shutter spring, the roller shutter spring must be pre-rolled so as to reset the roller shutter fabric normally. In the factory, according to the present disclosure, the roller shutter spring is pre-tightened to an appropriate number of turns. Before the installation weight 1 is installed, the self-locking mechanism is used to lock the adjustment shaft on the roller shutter spring pre-tightening force adjustment mechanism. When the cordless roller shutter spring adjuster of the present disclosure is installed on the installation weight 1, under the top pressure of the installation weight 1, the plate surface of the installation weight 1 pushes the transmission rod 16 forward, and the transmission rod 16 pushes the self-locking ring 14 forward, so that the ratchet teeth A 17 are disengaged from the ratchet teeth B 18, thereby unlocking the roller shutter spring pre-tightening force adjustment mechanism.

Furthermore, integrations and combinations of the various embodiments or examples and features of the various embodiments or examples described in this specification can be made by those skilled in the art without mutual conflict. While embodiments of the present disclosure have been shown and described, it will be understood that the above-described embodiments are illustrative and cannot be understood as being restrictive, and changes, modifications, substitutions and alterations may be made by those skilled in the art without departing from the scope of the present disclosure.

What is claimed is:

1. A cordless roller shutter spring regulator, comprising a roller shutter spring pre-tightening force adjustment mechanism and a self-locking mechanism, wherein the roller shutter spring pre-tightening force adjustment mechanism comprises an adjustment shaft and a pipe sleeve, one end of the adjustment shaft extends into the pipe sleeve, the other end of the adjustment shaft is provided with an adjustment wheel, and a through hole is provided on a wheel surface of the adjustment wheel;

wherein the self-locking mechanism is used to lock the adjustment shaft on the roller shutter spring pre-tightening force adjustment mechanism before an installation weight is installed; after the installation weight is installed, the self-locking mechanism unlocks the adjustment shaft on the roller shutter spring pre-tightening force adjustment mechanism under a top pressure of the installation weight;

wherein the self-locking mechanism comprises a pressing spring, a self-locking ring and a fixing ring, an end face of the self-locking ring being provided with a top pressure transmission rod and a ring of ratchet teeth A, the top pressure transmission rod being surrounded by the ring of ratchet teeth A, an end face of the fixing ring being provided with a ring of ratchet teeth B, the fixing ring being fixed on an end of the pipe sleeve via a screw, the adjustment shaft passing through the fixing ring, the pressing spring and the self-locking ring being sheathed on the adjustment shaft, the pressing spring pressing the self-locking ring against an end face of the fixing ring, so that the ratchet teeth A engage with the ratchet teeth B, the ratchet teeth A are able to slide relatively to the ratchet teeth B in one direction, one end of the top pressure transmission rod protrudes out of the pipe sleeve via the through hole on the adjustment wheel, and after the installation weight is installed, a plate surface of the installation weight pushes the top pressure transmission rod forward, and the top pressure transmission rod pushes the self-locking ring forward, so that the ratchet teeth A are disengaged from the ratchet teeth B and are unlocked.

2. The cordless roller shutter spring regulator according to claim 1, wherein a bearing is provided between the adjustment shaft and the pipe sleeve.

3. The cordless roller shutter spring regulator according to claim 2, wherein a spacer is also sheathed on the adjustment shaft, one end of the pressing spring presses against the self-locking ring, the other end of the pressing spring presses against the spacer, and the spacer presses against an end face of the bearing.

4. The cordless roller shutter spring regulator according to claim 3, wherein a limiting boss is further provided on an end face of the fixing ring, a limiting groove is provided on an end face of the pipe sleeve, and when the fixing ring is mounted to the pipe sleeve, the limiting boss is located in the limiting groove.

5. The cordless roller shutter spring regulator according to claim 4, wherein the roller shutter spring pre-tightening force adjustment mechanism further comprises a roller shutter spring connector and a main shaft, the roller shutter spring connector being used for fixing one end of the roller shutter spring, the adjustment shaft being of a hollow tubular structure, one end of the adjustment shaft being provided with a shifting block, one end of the main shaft extending into a cavity of the roller shutter spring connector and being fixedly connected to the roller shutter spring connector via a screw, the other end of the main shaft extending into the adjustment shaft, a brake spring being sheathed on a surface of the main shaft, the adjustment wheel being rotated, the adjustment wheel driving the adjustment shaft, the adjustment shaft driving the shifting block, and the shifting block driving one end of the brake spring to rotate around the main shaft, so that the brake spring locks the main shaft.

6. The cordless roller shutter spring regulator according to claim 5, wherein the other end of the brake spring presses against a side wall of a boss in the cavity of the roller shutter spring connector.

7. The cordless roller shutter spring regulator according to claim 6, wherein a cross groove is provided on an end face of the main shaft, and an installation head of the installation weight is inserted into the cross groove.

* * * * *